United States Patent [19]
Salden

[11] 4,103,918
[45] Aug. 1, 1978

[54] FENDER FLAP
[75] Inventor: Leroy Salden, St. Peter, Minn.
[73] Assignee: Winden Tool & Stamping, Inc., St. Peter, Minn.
[21] Appl. No.: 798,657
[22] Filed: May 19, 1977
[51] Int. Cl. .............................................. B62d 25/16
[52] U.S. Cl. ........................ 280/154.5 R; 16/128 R
[58] Field of Search ............... 280/154.5 R; 16/128 R

[56] References Cited
U.S. PATENT DOCUMENTS

| | | | |
|---|---|---|---|
| 2,591,196 | 4/1952 | Post | 280/154.5 R |
| 2,809,848 | 10/1957 | Carswell | 280/154.5R |
| 4,012,053 | 3/1977 | Bade | 280/154.5 R |

FOREIGN PATENT DOCUMENTS 92,327 1/1922 Switzerland ..................... 280/154.5 R Primary Examiner—Robert R. Song
Attorney, Agent, or Firm—James R. Cwayna

[57] ABSTRACT

A fender flap or the like which is particularly designed to be mounted on high clearance vehicles, the concept of such a device being to protect the body of the vehicle against the material being thrown upwardly by the wheels of the vehicle and including a relatively stable mounting section and having a hingeable section arranged therebelow and hinged thereto. The flap includes the first stable section and the hinged section, which sections are joined through pivot receiving portions on the adjacent portions thereof and with a connecting rod member received therethrough, said pivot receiving sections or portions including relatively rectangular configurations alternately formed on the stable portions and the hinged portions. Spring loading mechanism is provided to normally maintain the entire flap in vertical relation.

3 Claims, 7 Drawing Figures

U.S. Patent  Aug. 1, 1978  4,103,918
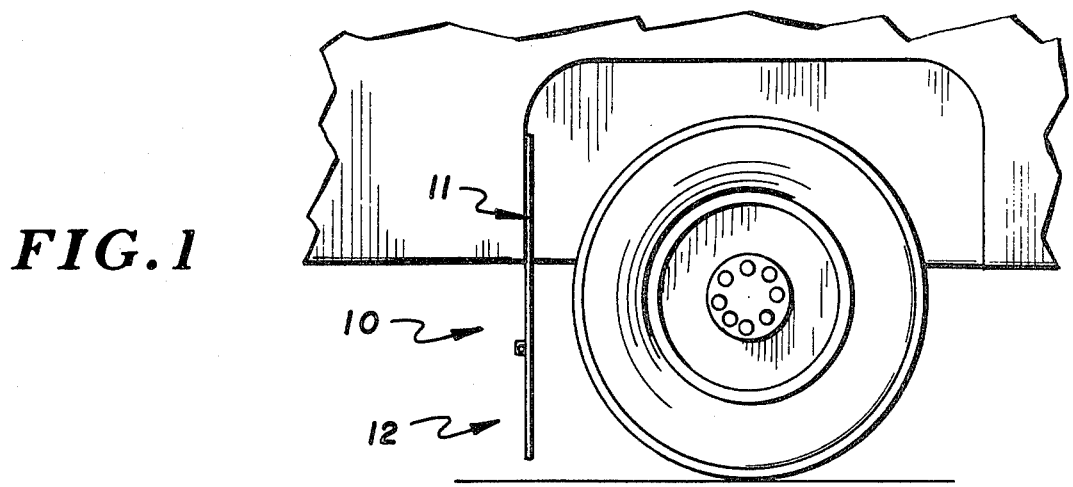
FIG. 1
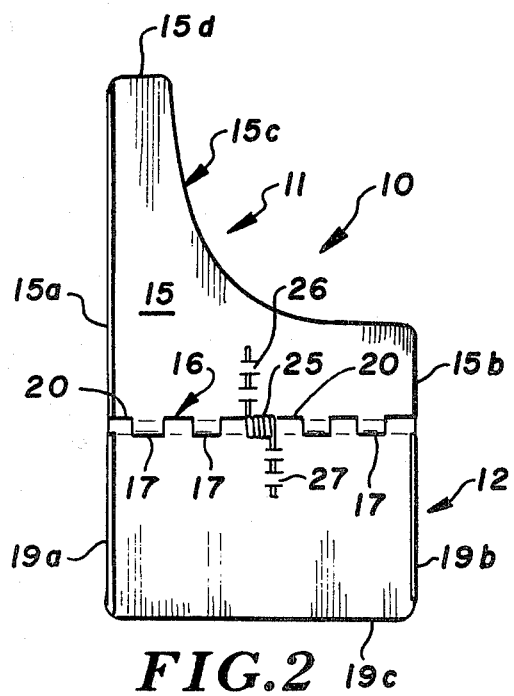
FIG. 2  FIG. 3  FIG. 4
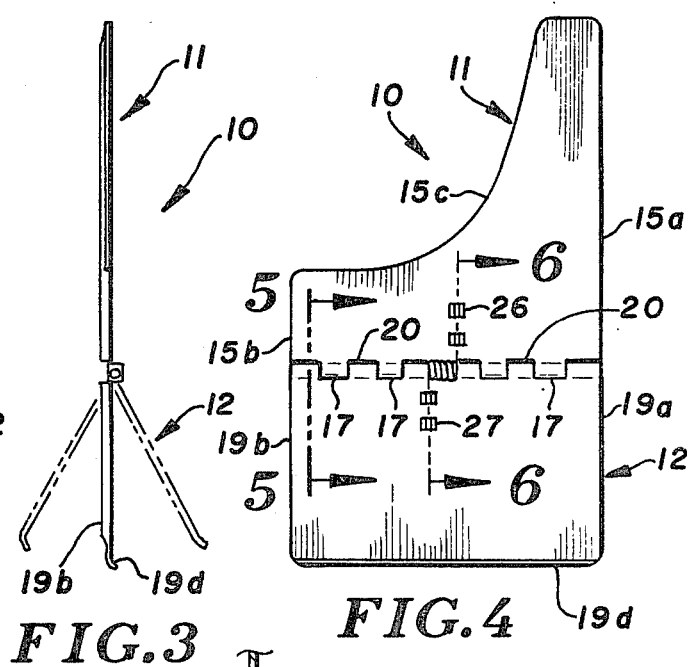
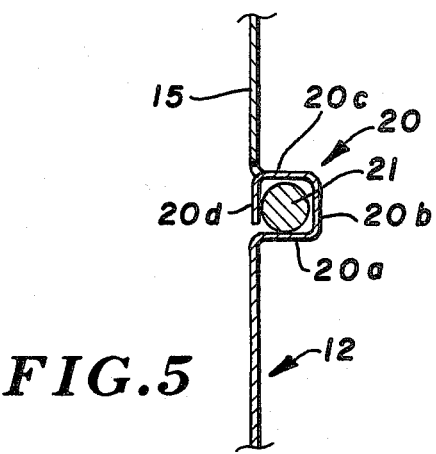
FIG. 5
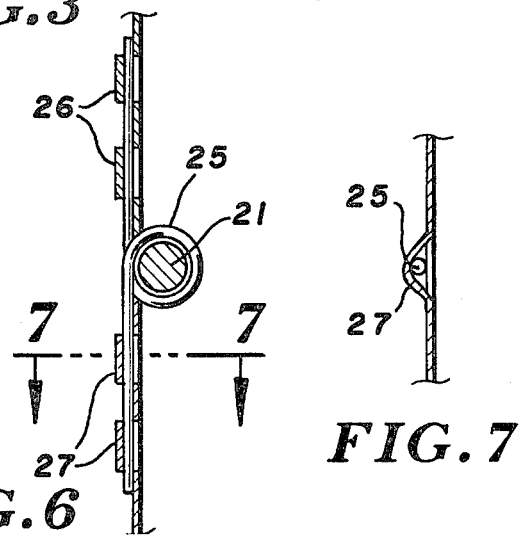
FIG. 6  FIG. 7

FENDER FLAP

FIELD OF THE INVENTION

This invention relates generally to protective devices for vehicles and more particularly to a guard for installation in relation to the wheels of a vehicle to prevent debris from the road surface being propelled upwardly by the wheels and still more particularly to such a guard which is provided with a hinged portion at the lower extremity thereof.

BACKGROUND AND OBJECTS OF THE INVENTION

The use of fender or mud flaps on vehicles is well known in the art. The use of such devices is not only to protect the vehicle upon which the same is mounted but also to protect against material being thrown rearwardly such that it may strike other vehicles following therebehind.

To the best of applicant's knowledge, the prior art discloses various flexible fender flaps which are provided of a resilient material and also provides flexible flaps which include hinging means between selected portions of the flap such that the same provides a lower section that is relatively moveable with respect to the upper, attached section. With the exposure to rocks, mud and other deteriorating materials, applicant has found that the flexible material devices are relatively short lived and has also found that the hinging mechanisms, due to the construction of the hinge, is also short lived.

With the invention as disclosed herein, applicant provides a hinged fender flap mechanism which includes a formed, pivot receiving portion, which portion includes an interlocking arrangement between the portions of the mechanism such that each element thereof includes a selected pivot receiving area and that the pivot element received therein provides the joinder between the flap elements.

It is therefore an object of applicant's invention to provide a fender flap mechanism which includes a pair of pivotally joined elements which elements permit movement of the elements in two directions from a normally aligned relation.

It is therefore a further object of applicant's invention to provide a fender flap mechanism which includes a formed, pivot receiving portion designed to provide a housing for the pivotal element and which housing provides an area of a substantially different shape from the pivot element to allow a certain degree of operational latitude between the pivotal element and the flap elements.

It is yet a further object of applicant's invention to provide a normally biased, hinged fender flap or protective guard mechanism for use on wheeled vehicles, which biasing element permits shifting the sections of the hinged flap in either direction from a normal aligned relation and which biasing element will exert a force on the sections to bring the same into aligned relation.

These and other objects and advantages of applicant's invention will more fully appear from a consideration of the accompanying description made in connection with the accompanying drawings and in which drawings the same number or numeral is utilized to identify the same or similar parts throughout the accompanying views, and in which:

FIG. 1 is a side elevational view of a vehicle and the wheel thereof and illustrating the protective flap embodying the concepts of applicant's invention being mounted on the vehicle;

FIG. 2 is a front elevation of the fender flap embodying the concepts of applicant's invention;

FIG. 3 is a side elevation of applicant's device and illustrating the shifting thereof in dotted lines;

FIG. 4 is a rear elevation of the device;

FIG. 5 is a vertical section taken substantially along Line 5—5 of FIG. 4;

FIG. 6 is a vertical section taken substantially along Line 6—6 of FIG. 4;

FIG. 7 is a horizontal section taken along Line 7—7 of FIG. 6 and illustrating a further detail of the spring and the retaining portions therefore.

In accordance with the accompanying drawings, applicant's device, referred to hereinafter as a fender flap, is generally designated 10. The flap as illustrated incorporates a first mounting section 11 and a movable retarding section 12. The concept of applicant's device is to provide a unit mountable upon a rear body portion of a tire well of a vehicle to prevent stones and other debris from being thrown upwardly by the tire of the vehicle either against the body of the vehicle or rearwardly from the vehicle.

In the form shown, the upper, first mounting section 11 includes a relatively thin plate member 15 including a pair of longitudinally extending formed edges 15a, 15b and having a curved area 15c extending from edge 15b such that the same will normally conform to the body of the vehicle and which curved side 15c terminates in a transversely extending upper edge 15d communicating with side 15a.

The edges 15a, 15b are curved or bent to provide additional strength to the body member 15.

As illustrated in FIGS. 2 and 4, the lower edge 16 of the member 15 includes a plurality of downwardly extending, shaped pivot element receiving members 17 spaced along the edge 16 and the shape of such members is similar to but reversed from the illustration of FIG. 5. The particular shape of this portion will be discussed in connection with a description of the lower, moveable element 12.

The lower, movable, retarding section 12 consists of a generally rectangular member of a width the same as the width of the upper member 15 and the lateral edges 19a, 19b thereof are again, bent or curved to provide additional strength to the section. The lower edge 19c is formed or curved as at 19d for additional strength. As with the upper portion 11, the lower section 12 includes a plurality of spaced upwardly extending, shaped pivot element receiving members 20 positioned along the upper edge thereof and the sizing of these elements agrees with the sizing of the elements 17 on the upper portion 11 such that, when the same are positioned next to one another, a continuous pivot receiving passage is provided.

The particular shape of the pivot receiving elements 20 is shown in FIG. 5. As illustrated therein, each extending section, 17 and 20 includes a formed, generally rectangular element consisting of a lower edge 20a, a forward edge 20b, a top edge 20c and a rear edge 20d which rear edge 20d is in substantial alignment with the plane of the element 12. It should be obvious that this structure provides a relatively square internal passage and, as illustrated in FIG. 5, the pivot or connecting element 21 is round. This square passage and round connector then provide a combination with alignment between the connected portions, 11, 12 being maintained by the contact of the round surfaces of the connector 21 with the flat internal surfaces of the passage and this shape difference allows and provides for a more efficient operation. This arrangement, rather that a circular to circular configuration, as found by applicant, provides a self cleaning aspect to this joinder portion. Close fit sections, when exposed to the mud, dirt and other road debris tend to fill and bind. Applicant's arrangement, even though allowing additional area into which such material could lodge, due to the difference in shapes used tends to dislodge any material which accumulates therein.

A biasing member 25 is positioned generally centrally of the upper and lower portions of the unit and is held to each of the sections by providing portions of each to be formed as at 26, 27 outwardly from the normal plane of the portions 11, 12 such that the ends of the biasing member 25 may be received therein as illustrated in FIG. 7. As illustrated in FIG. 6, the biasing member 25 is a torsion spring and the coiled element thereof provides a receiving area for the connector 21 and this connector passes therethrough. By having the respective ends of the spring 25 received into and attached to the upper 11 and lower 12 portions of the unit, it should be obvious that the lower portion 12 will be moveable in both directions, as illustrated in the dotted line portion of FIG. 3, with the biasing element tending to return the same to an aligned position with respect to the upper portion 11.

The lower portion of applicant's device, being hinged permits a unit which may be positioned relatively close to the ground. This offers certain advantages. With such a lower positioned device, it should be obvious that more material will be deflected and not be allowed to be directed rearwardly from the tire. The hinge mechanism permits the lower portion of the unit to float and if the vehicle should ride over any upward directed element of a road, such as a curbing, the hinging will allow this lower portion to move, rather than be damaged by such element. The biasing member will bring the unit back into the proper vertical alignment behind the wheel when the vehicle has passed over such a bump or rise in the road.

It should be obvious that applicant has provided a new and unique fender flap or deflector unit which not only provides a hinged construction for the same but which also provides a hinging arrangement which will insure a non-clogging connection for the elements and therefore provide a positive operative effect for continued operation of the unit.

The use of the article should be obvious. Means for attaching the upper portion of the element to the vehicle body must be provided and the unit should be relatively aligned with the tire of the vehicle to receive material that may be cast rearwardly therefrom.

What I claim is:

1. A fender flap for the deflection of road materials consisting of:
   a. a first, generally rectangular plate member arranged for attachment to a vehicle;
   b. a second, generally rectangular plate member arranged for attachment to said first plate member to be in depending relation thereto;
   c. means for hingedly connecting said first plate member to said second plate member; and,
   d. said means for hingedly connecting said first plate member to said second plate member including a plurality of spaced, aligneable, pivot receiving members arranged along respective edges thereof, said pivot receiving members defining a generally rectangular interior configuration and said means including a connecting member of a generally circular configuration.

2. The structure set forth in claim 1 and said pivot receiving members providing a generally square internal configuration, said means for hingedly connecting said members being of a generally circular configuration.

3. The structure set forth in claim 1 and said second plate member provided of a flat surface and provided with a formed, lower edge portion for lateral strengthening thereof.

* * * * *